UNITED STATES PATENT OFFICE 2,746,843
MANUFACTURE OF HYDROGEN CYANIDE

Frederick James Bellringer, Wimbledon, London, England, assignor to The Distillers Company Limited, Edinburgh, Scotland, a British company No Drawing. Application October 28, 1952,
Serial No. 317,360

Claims priority, application Great Britain
November 6, 1951

9 Claims. (Cl. 23—151)

The present invention relates to the manufacture of hydrogen cyanide.

In U. S. Patent No. 2,405,963 there is disclosed a process which relates to the manufacture of formaldehyde cyanhydrin whereby formaldehyde cyanhydrin is obtained by co-oxidising ammonia and methanol in the gas phase in the presence of a solid oxidation catalyst specially molybdate. In the process a part of the methanol charged is converted to formaldehyde cyanhydrin and another part to free hydrogen cyanide. The preferred temperature for the process is about 475° to 525° C. and the relative molar proportions of methanol and ammonia employed in order to furnish optimum results of the desired formaldehyde cyanhydrin are stated to be about 0.5 to 15.0 moles of methanol per mole of ammonia. The specification contains a warning that if a molar ratio of methanol to ammonia of less than 2.0 is employed there is a danger of a "runaway" reaction in which the temperature is difficult or impossible to control. According to the Example 1 the yield of hydrogen cyanide based on ammonia is 55% and that of formaldehyde cyanhydrin 18%. From this it can be calculated that based on methanol the molar yields are about 24% HCN and about 16% of formaldehyde cyanhydrin.

It is an object of the present invention to provide a process in which hydrogen cyanide is practically the sole product of the reaction. It is a further object to convert per pass, a high percentage of the fed compound selected from the group methanol and formaldehyde so that the recovery of methanol or formaldehyde from the resulting reaction products becomes unnecessary.

The process of the invention is based on the discovery that the formation of formaldehyde cyanhydrin can be practically eliminated and almost quantitative yields of hydrogen cyanide obtained, if the molar ratio between ammonia and methanol or formaldehyde in the feed gas is kept above 1, so that an excess of ammonia is present throughout the whole reaction whilst at the same time the initial concentration of methanol or formaldehyde in the gas mixture is restricted to less than 5 litres of methanol or formaldehyde vapours in 100 litres of the gaseous mixture which is approximately 6.7 grams of methanol or 6.3 grams of formaldehyde under atmospheric conditions and preferably to less than 3 litres equal to about 4 grams of methanol or about 3.8 grams of formaldehyde respectively under atmospheric conditions. Although a considerable excess of ammonia may be used without disadvantageously affecting the reaction no advantage is gained by using substantially more than 2 moles of ammonia to one mole of methanol or formaldehyde at the start.

Accordingly the process for the manufacture of hydrogen cyanide comprises passing a gaseous mixture containing less than five litres and preferably less than three litres of an organic compound selected from the group consisting of methanol and formaldehyde in 100 litres of the gaseous mixture, ammonia in an amount such that the molar ratio of ammonia to said organic compounds is more than 1, and more than one mole of oxygen to each one mole of said organic compound charged at a temperature between 340 and 450° C. over a catalyst comprising molybdenum oxide.

Catalysts suitable for the reaction are those based on molybdenum oxide alone or in admixture with phosphoric acid. Excellent efficiencies especially with regard to ammonia are obtained with molybdenum oxide alone. Carriers for the active catalyst of various kinds may be used. Suitable carriers are aluminium oxide and the various forms of silica. The carrier before or after addition of the catalyst may be subjected to some form of heat treatment in order to modify its surface.

The oxygen content in the gaseous mixture of the reactants should be in excess of that which will result in the oxidation of the starting materials according to the formula:

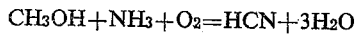

$$CH_3OH + NH_3 + O_2 = HCN + 3H_2O$$

and it is surprising that such an oxygen concentration does not lead to a "runaway" reaction when the temperature in the catalyst zone is maintained below 450° C. and preferably between 340° and 450° C. Temperatures of more than 450° C. lead quickly to complete combustion of the methanol or formaldehyde with their conversion into carbon dioxide. The total concentration of oxygen in the reactant gas mixture should however, not exceed 20%.

The reaction may be carried out in the presence of suitable diluents such as steam or nitrogen. It is therefore convenient to use oxygen in the form of air. The gas mixture may be preheated in the usual way. In order to avoid the risk of ignition in the free spaces of the pre-heater an unexplosive mixture of methanol or formaldehyde and air may be pre-heated and then ammonia and any further organic starting material required for making up the mixture of the reactant gases according to the process of the invention may be added shortly before or into that part of the reactor which is taken up by the catalyst. The catalyst may be arranged as a stationary bed and the heat generated by the reaction removed by outside cooling when sufficiently narrow reaction chambers are used. Other suitable ways of carrying out exothermic gas reactions may be used for instance inter stage cooling between relatively shallow catalyst beds. As an alternative, a fluidised bed technique may be employed for the reaction. Furthermore, two or more reactors in series may be used, the first preferably containing a less active catalyst than the subsequent reactors. The contact times of the gas mixture with the catalyst depend on a number of factors including the reaction temperature, the particular catalyst employed, and the desired degree of conversion of the organic compound. Generally with low concentrations of methanol or formaldehyde in the feed mixture, contact times from one-tenth to ten seconds are suitable, these being calculated by relating the volume of gas mixture fed per second to the reactor and measured at standard temperature and pressure to the volume occupied by the catalyst in the reactor. By suitably regulating the contact times for instance by adjusting the volume of the catalyst, the speed of flow of the gaseous mixture of the reactants and the like it is possible to achieve substantially complete conversion of the methanol charged.

The excess of ammonia may be recovered from the resulting gaseous reaction mixture, for instance by absorption in acid or it may be employed again for the production of hydrogen cyanide by recycling it to the reaction zone.

Since the stability of the hydrogen cyanide under the special conditions of the reaction is very great, it is possible to recycle part of the gas leaving the reactor whilst the concentration of the reactants in the charge is replenished and adjusted by the addition of one or more of the feed components. Thus it is possible to recycle a part of the gaseous mixture issuing from the reactor whilst hot and branching off another part for the recovery of the hydrogen cyanide produced. In this way, a gaseous mixture containing an increased amount of hydrogen cyanide is passed to the recovery system.

Hydrogen cyanide may be recovered from the gaseous mixture leaving the reactor by cooling said mixture, contacting it with aqueous acid in order to remove the excess of ammonia present and then scrubbing with water. Distillation of the resulting scrubber water yields concentrated hydrogen cyanide. It is also possible to contact the exit gases in the well known way with alkali hydroxides or carbonates whereby hydrogen cyanide is converted to the corresponding alkali cyanide then washing the ammonia and any traces of methanol from the gas stream in subsequent scrubbers.

By carrying out the process according to the present invention, substantially the whole or at least 90% of the methanol or formaldehyde is converted into hydrogen cyanide so that recycling of methanol or formaldehyde or their recovery may be dispensed with.

The following examples illustrate the manner in which the invention may be carried out in practice:

*Example 1*

Per hour, 164 litres (1.426 moles of oxygen) of air and 4.5 litres (0.196 mole) of ammonia, at atmospheric conditions, were mixed with 4.46 grams (0.139 mole) corresponding to 1.9 litres in 100 litres vapourised methanol and passed into a reactor consisting of a 1 inch steel tube jacketed with a thermostatically controlled bath of liquid salt, the tube containing 150 cm.$^3$ of a catalyst prepared as follows: $3/16''$ pellets of ammonium molybdate had been heated to 400° C. in an air stream till all ammonia and water was removed. The temperature of the catalyst bed ranged from 404° C. at the feed inlet to 431° C. maximum. The exit gases were scrubbed in a column in which a 15% by weight sulphuric acid was circulated, to remove ammonia, and then passed through water absorption columns in which the gases were scrubbed in counter-current. The water solution was distilled, giving concentrated hydrogen cyanide as distillate in almost quantitative recovery. The yield of hydrogen cyanide was 94.1% based on the amount of methanol fed into the reactor.

*Example 2*

A reactor, consisting of a U-tube of $1/4''$ bore steel was charged with 7.2 grams of a catalyst consisting of $1/8''$ pellets of 20% phospho-molybdic acid impregnated on silica gel, and immersed in a thermostatically controlled bath of liquid salt at 400° C. Per hour, 15.6 litres of air (0.135 mole of oxygen and 0.64 litre (0.028 mole) of ammonia, measured at atmospheric pressure and temperature were preheated and mixed with 0.64 gram (0.020 mole) of vapourised methanol corresponding to 3 litres in 100 litres of the gas mixture and passed over the catalyst. The gas stream was countercurrently scrubbed with water, hydrogen cyanide being recovered in a yield of 77.4%, based on the methanol fed.

The following comparative experiments show the effect of reducing the molar ratio of ammonia to methanol to less than 1. They were carried out under otherwise similar conditions.

Over a molybdic oxide catalyst consisting of $3/16''$ pellets a gas mixture containing 3 litres of methanol (NTP) measured at normal temperature and pressure was passed with a residence time of 5 seconds at a temperature of 420° C. (maximum) the ammonia to methanol ratio (molar) being varied according to the following table:

| NH$_3$/MeOH in feed gas | Yield percent on methanol fed, free HCN |
|---|---|
| 1.1 | 90 |
| 1.0 | 86.6 |
| 0.86 | 72.1 |
| 0.78 | 49.8 |

*Example 3*

A catalyst was prepared by heating ammonium molybdate in the form of pellets in a current of air at 400° C. until all the water and ammonia had been removed.

The molybdenum oxide thus prepared was charged into a 1 inch mild steel tube wherein it was maintained at a temperature ranging from 399 to 396° C., whilst per hour a mixture of 164 litres of air and 4.5 litres of ammonia with 9.88 grams of a vapourised 33.4% by weight formaldehyde solution corresponding to 1.5 litres of formaldehyde in 100 litres gas mixture was passed thereover.

The gaseous mixture issuing from the reactor was scrubbed in a tower with dilute sulphuric acid to remove traces of ammonia and then passed through water from which by distillation concentrated hydrocyanic acid was obtained. The conversion of formaldehyde into hydrogen cyanide amounted to 81.2%.

I claim:

1. Process for the manufacture of hydrogen cyanide which comprises passing a gaseous mixture containing less than 5 litres of vaporised organic compound selected from the group consisting of methanol and formaldehyde in 100 litres of said mixture, ammonia in an amount such that the molar ratio of ammonia to said organic compound is more than 1, and more than one mole of free oxygen to each one mole of said organic compound charged, at a temperature between 340° and 450° C. over a catalyst comprising molybdenum oxide.

2. Process according to claim 1 wherein the gaseous mixture contains less than 3 litres of said organic compound vapours in 100 litres of said mixture.

3. Process according to claim 1 wherein the molybdenum oxide is used in conjunction with phosphoric acid.

4. Process according to claim 1 wherein the catalyst is distributed on a carrier.

5. Process according to claim 1 wherein the initial molar ratio of ammonia to said organic compound does not exceed 2.

6. Process according to claim 1 wherein the gaseous mixture of the reactants is diluted by inert gases.

7. Process according to claim 1 wherein the concentration of oxygen in the gaseous mixture does not exceed 20%.

8. Process according to claim 1 wherein the contact time between the reactant gas mixture is regulated in such a manner that the amount of said organic compound in the said mixture is substantially completely used up.

9. Process for the manufacture of hydrogen cyanide which comprises passing a gaseous mixture containing less than 5 litres of vaporised organic compound selected from the group consisting of methanol and formaldehyde in 100 litres of said mixture, ammonia in an amount such that the molar ratio of ammonia to said organic compound is more than 1, and more than one mole of free oxygen to each one mole of said organic compound charged, at a temperature between 340° and 450° C. over a catalyst comprising molybdenum oxide, the amount of ammonia in the reactant gas mixture being such that the gaseous reaction mixture leaving the reactor contains unreacted ammonia, neutralising said unreacted ammonia before the absorption of the hydrogen cyanide produced and recovering free hydrogen cyanide by distillation.

References Cited in the file of this patent

UNITED STATES PATENTS

| | | |
|---|---|---|
| 1,492,193 | Beindl | Apr. 29, 1924 |
| 1,627,144 | Bredig | May 3, 1927 |
| 2,006,981 | Andrussow | July 2, 1935 |
| 2,405,963 | Larson | Aug. 29, 1946 |
| 2,429,262 | Fallows | Oct. 21, 1947 |
| 2,496,999 | Houpt et al. | Feb. 7, 1950 |